(12) United States Patent
Cournoyer

(10) Patent No.: US 11,728,539 B2
(45) Date of Patent: Aug. 15, 2023

(54) SYSTEMS AND METHODS FOR MANAGING ADHESIVE JOINTS

(71) Applicant: Rivian IP Holdings, LLC, Plymouth, MI (US)

(72) Inventor: Travis Cournoyer, Redondo Beach, CA (US)

(73) Assignee: Rivian IP Holdings, LLC, Irvine, CA (US)

(*) Notice: Subject to any disclaimer, the term of this patent is extended or adjusted under 35 U.S.C. 154(b) by 314 days.

(21) Appl. No.: 16/997,340

(22) Filed: Aug. 19, 2020

(65) Prior Publication Data

US 2022/0059810 A1 Feb. 24, 2022

(51) Int. Cl.
*H01M 50/213* (2021.01)
*H01M 50/502* (2021.01)

(52) U.S. Cl.
CPC ....... *H01M 50/213* (2021.01); *H01M 50/502* (2021.01)

(58) Field of Classification Search
CPC ... H01M 50/213; H01M 50/502; H01M 50/20
See application file for complete search history.

(56) References Cited

U.S. PATENT DOCUMENTS

2016/0197315 A1* 7/2016 Tatsumi ............. H01M 50/183
429/185

* cited by examiner

*Primary Examiner* — Jane J Rhee
(74) *Attorney, Agent, or Firm* — Haley Guiliano LLP

(57) ABSTRACT

A method for making a battery system includes applying fast-cure and slow-cure adhesives to interfaces between components. The fast-cure adhesive allows manipulation of the assembly during manufacturing while the slow-cure adhesive cures. The slow-cure adhesive provides desired strength and toughness as needed during use of the final assembly. The fast-cure adhesive and slow-cure adhesive have respective curing schedules. The fast-cure adhesive includes a moisture-curing adhesive or any other suitable adhesive curing on the order of seconds such as UV-activated or cyanoacrylate adhesives. The slow cure adhesive includes any suitable structural adhesive such as a two-part mix-cure epoxy or acrylic. The components adhered using the fast-cure adhesive and slow-cure adhesive include side wall sections, battery cells, mounting bracket, bus bars, or any other suitable components. The fast-cure and slow-cure adhesives are applied in any suitable pattern such as, for example, beads, dots, paths, non-intersecting paths, or any other suitable application shape.

13 Claims, 5 Drawing Sheets

SYSTEMS AND METHODS FOR MANAGING ADHESIVE JOINTS

INTRODUCTION

The present disclosure is directed to assembling battery systems using adhesives, and more particularly, to applying adhesives having different curing requirements to allow handling of components.

SUMMARY

In some embodiments, the present disclosure is directed to a method for making a battery system. The method includes applying a first adhesive to a first surface, applying a second adhesive to a second surface, positioning the first and the second surface to form an interface of the battery system, applying a curing schedule corresponding to the second adhesive to form an assembly, and performing a manufacturing process on the assembly after the curing schedule and while the first adhesive cures. The first adhesive is a one-part or two-part slow-curing adhesive having a first curing time, and the second adhesive is a fast-curing adhesive having a second curing time less than the first curing time. To illustrate, in some embodiments, the first adhesive includes a one-part thermoset epoxy adhesive or a two-part epoxy adhesive (e.g., that cures in 24 hours). The manufacturing process may include any suitable process for making a battery system after the first curing schedule is applied, including mechanical processes, electrical process, chemical processes, or a combination thereof.

In some embodiments, the first surface and the second surface do not overlap.

In some embodiments, the interface is between a plurality of battery cells and a sidewall, the first surface is at least one of a side of the plurality of battery cells or a side of the sidewall, and the second surface is at least one of a side of the plurality of battery cells or a side of the sidewall.

In some embodiments, the second adhesive is a UV-cure adhesive, and the sidewall includes a transmittance sufficient to allow UV light to pass through to UV-cure the second adhesive during the curing schedule.

In some embodiments, the interface is between a plurality of battery cells and a carrier, the first surface is at least one of an end of the plurality of battery cells or a side of the carrier, and the second surface is at least one of an end of the plurality of battery cells or a side of the carrier.

In some embodiments, the interface is between a busbar and a sidewall, the first surface is at least one of a surface of the busbar or a surface of the sidewall, and the second surface is at least one of a surface of the busbar or a surface of the sidewall. The busbar is configured to be electrically coupled to a plurality of battery cells, and the sidewall is configured to provide structural support to the plurality of battery cells.

In some embodiments, the interface is between a sidewall and a mounting bracket, such as a shear wall, the first surface is at least one of a surface of the sidewall or a surface of the mounting bracket, and the second surface is at least one of a surface of the sidewall or a surface of the mounting bracket. The sidewall is configured to provide structural support to the plurality of battery cells, and the mounting bracket is configured to provide structural support to the plurality of battery cells and the sidewall. In some embodiments, the mounting bracket includes one or more through features to allow the curing schedule of the second adhesive.

In some embodiments, performing the manufacturing process includes assembling more components, cleaning the assembly, inspecting the assembly, instrumenting the assembly, making battery connections (e.g., electrically coupling a plurality of battery cells to one or more busbars), any other suitable process, or any combination thereof. In some embodiments, performing the manufacturing process includes mechanically coupling a plurality of battery cells to a cooling plate.

To illustrate, in some embodiments, the method includes applying a first adhesive to a first area of an interface between a plurality of battery cells and a sidewall, applying a second adhesive to a second portion of the interface between the plurality of battery cells and the sidewall, positioning the sidewall adjacent to the plurality of battery cells, applying a curing schedule corresponding to the second adhesive to form an assembly that comprises the plurality of battery cells and the sidewall, and performing a manufacturing process on the assembly after the curing schedule and while the first adhesive cures. The first adhesive is a one-part or two-part slow-curing adhesive having a first curing time, and the second adhesive is a fast-curing adhesive having a second curing time less than the first curing time. In some embodiments, the first portion and the second portion do not overlap. To illustrate, in some embodiments, the second adhesive includes a fast-setting moisture-cure adhesive (e.g., a cyanoacrylate adhesive or other suitable adhesive), a UV-cure adhesive, or a combination thereof. In some embodiments, the first adhesive includes a two-part epoxy adhesive.

In some embodiments, the present disclosure is directed to a battery system. The battery system includes a plurality of battery cells, a sidewall, a busbar, a mounting bracket, assembled using adhesives. The plurality of battery cells is arranged with an end of each battery cell lying substantially in a plane. The plurality of battery cells include a lateral surface and a planar surface including the end of each battery cell. For example, the end is an axial end, including a face opposite the battery cells' electric terminals. The sidewall is arranged adjacent to the lateral surface of the plurality of battery cells. The busbar is configured to couple a first subset of the plurality of battery cells in parallel with each other and in series with a second subset of the plurality of battery cells. The mounting bracket is arranged adjacent to the sidewall and is configured to provide structural support to the sidewall and to the plurality of battery cells. A first adhesive, having a first curing time, is applied to a first surface area between the plurality of battery cells and the sidewall. A second adhesive, having a second curing time less than the first curing time, is applied to a second surface area between the plurality of battery cells and the sidewall. In some embodiments, the second surface area and the first surface area do not overlap.

In some embodiments, the second adhesive includes a UV-cure adhesive. In some embodiments, the second adhesive includes a fast-setting moisture-cure adhesive (e.g., a cyanoacrylate adhesive).

In some embodiments, the first adhesive is applied to a third surface area in an interface between the sidewall and the mounting bracket, and the second adhesive is applied to a fourth surface area in an interface between the sidewall and the mounting bracket that does not overlap the third surface area.

In some embodiments, the first adhesive is applied to a third surface area in an interface between the sidewall and the busbar, and the second adhesive is applied to a fourth surface area in an interface between the sidewall and the busbar that does not overlap the third surface area.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION

The present disclosure is directed to the manufacturing of battery modules using adhesives. In some embodiments, battery module components are assembled using only adhesives, rather than fasteners or other affixments, to provide bonding and structural support. Selection of the adhesives used may be based on surface type and material, curing constraints, required bonding strength, conductive properties (e.g., thermal and electrical), any other suitable material properties, or a combination thereof. For example, while it may be desirable to use highest strength adhesives possible at all joints, some components of a battery module may be temperature-sensitive, thus limiting the types of curing schedules that can be accommodated. To illustrate, the highest-strength class of adhesives, which include thermosets requiring baking at high temperature, might not be viable contenders for use in a battery module due to constraints from temperature sensitivity of the battery cells. Other adhesives include two-part mixed adhesive that cure after mixing of two parts. However, as opposed to heat, these two-part adhesives typically require time (e.g., on the order of minutes) to cure sufficiently to allow handling of the work piece (e.g., for subsequent manufacturing steps). Instant-cure type adhesives such as, for example, moisture-cure adhesives or UV adhesives cured with UV light, cure on the order of seconds but lack sufficient strength in design and tend to be more brittle. Accordingly, it is desirable to design adhesive joints of a battery module in such a way that utilizes high strength adhesives while allowing manufacturing to quickly handle a workpiece after marrying two parts held together with the adhesive joint.

Figure 1:
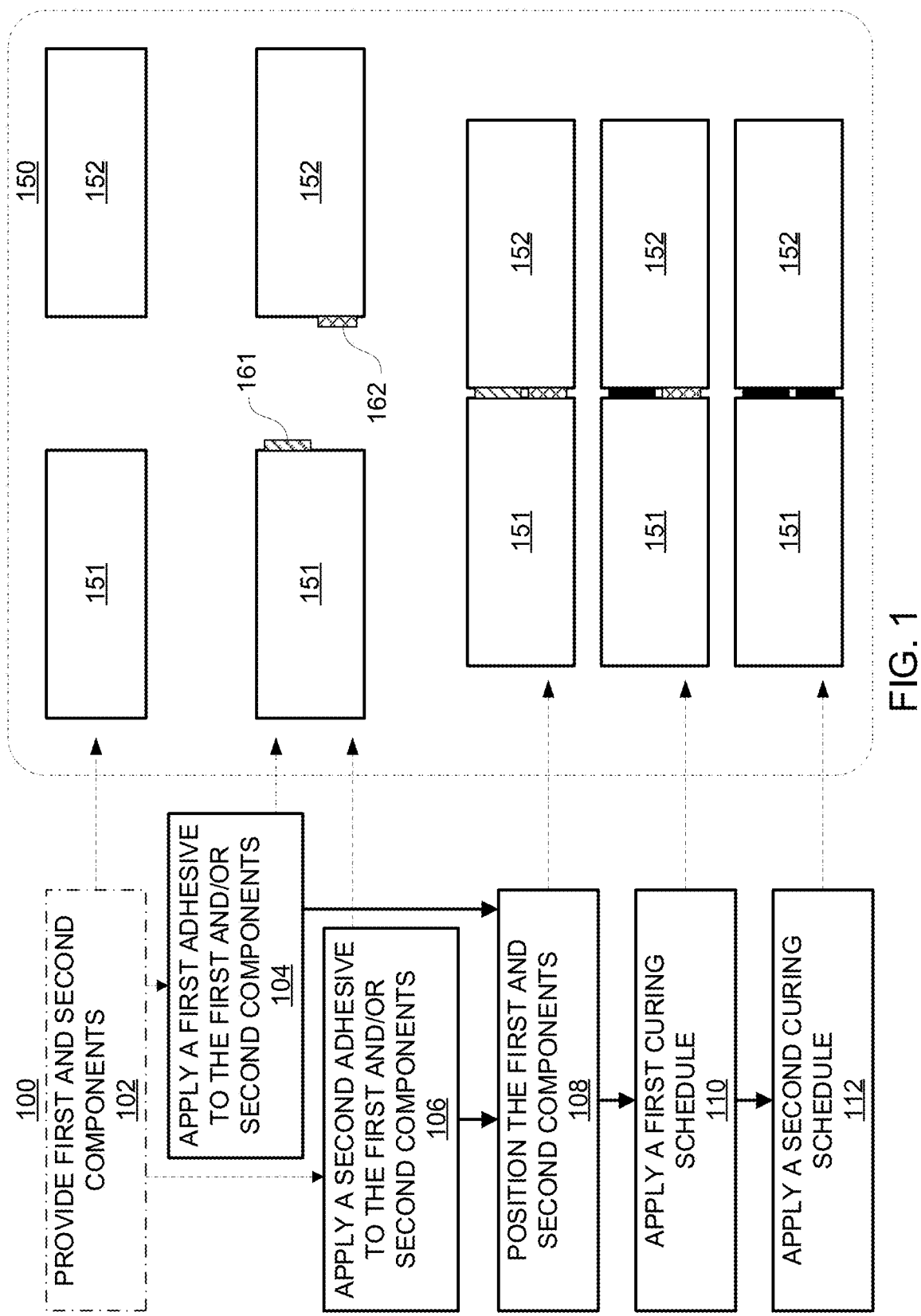
FIG. 1 shows a flowchart of an illustrative process for adhering components of a battery module using adhesives, in accordance with some embodiments of the present disclosure.

FIG. 1 shows a flowchart of illustrative process 100 for adhering components of a battery module using adhesives, in accordance with some embodiments of the present disclosure. Panel 150 of FIG. 1 illustrates bonding of components 151 and 152 using process 100. In some embodiments, process 100 allows the selective and strategic use of an instant-cure adhesive and a high-strength, one-part or two-part, room-temperature curing adhesive for high strength and quick handling of a work piece (e.g., the bonded assembly including components 151 and 152).

Step 102 includes one or more of selecting, retrieving, arranging, or preparing (e.g., cleaning, etching, coating), or otherwise providing first and second components to be assembled. In an illustrative example, the first and second components may include a plurality of battery cells, one or more side walls, one or more carriers, one or more cooling plates, any other suitable component, or any combination thereof. As illustrated, component 151 and component 152 may include any suitable components of a battery module. The first and second components may include metal surfaces, plastic surfaces, surfaces of any other suitable material, or any combination thereof. In some embodiments, more than two components may be provided at step 102. For example, in some circumstances, more than two components may be bonded together using process 100.

Step 104 includes applying a first adhesive to the first component, the second component, or both. The first adhesive may have a corresponding first curing schedule, or range thereof, that indicates over what conditions (e.g., time, temperature, irradiance, chemical environment) the first adhesive can be expected to cure. For example, the first adhesive may include a slow-cure adhesive or a fast-cure adhesive. At step 104, the first adhesive may be applied in any pattern or layout, covering any suitable area of the first component, the second component, or both. For example, the first adhesive may be applied along a path on a surface of the first component or second component. In some embodiments, the path is intended to provide bonding coverage at a desired location, bonding having at least a predetermined surface area, or a combination thereof. In some embodiments, the first adhesive is applied allowing for a second adhesive to be applied. For example, the first adhesive may be applied to a first surface area of a surface, leaving a second surface area uncovered that can accommodate a second adhesive (e.g., at step 106). As illustrated, first adhesive 161 is applied to component 151, although it will be understood that first adhesive 161 may be applied to component 151, component 152, or both.

Step 106 includes applying a second adhesive to the first component, the second component, or both. For example, the second adhesive may include a slow-cure adhesive or a fast-cure adhesive, different from the first adhesive. The second adhesive may have a corresponding second curing schedule, or range thereof, that indicates over what conditions (e.g., time, temperature, irradiance, chemical environment) the second adhesive can be expected to cure. For example, the second adhesive may include a slow-cure adhesive or a fast-cure adhesive. At step 106, the second adhesive may be applied in any pattern or layout, covering any suitable area of the first component, the second component, or both. For example, the second adhesive may be applied along a path on a surface of the first component or second component. In some embodiments, the path is intended to provide bonding coverage at a desired location, bonding having at least a predetermined surface area, or a combination thereof. In some embodiments, the second adhesive is applied such that it does not overlap with the first adhesive. For example, the interface between the first component and the second component may include a surface area, of which a first portion is covered in the first adhesive and a second portion is covered in the second adhesive. As illustrated, second adhesive 162 is applied to component 152, although it will be understood that second adhesive 162 may be applied to component 151, component 152, or both. In some embodiments, the second adhesive is a fast-curing, or instant-curing, adhesive and is applied after the first adhesive to prevent curing before the components can be positioned.

Step 108 includes positioning the first component and the second component. In some embodiments, step 108 includes arranging the first and second components in a desired configuration such that when the first and second adhesives cure, a desired assembly results. In some embodiments, the first component, second component, or both includes one or more locating features to allow more precise positioning during curing of the first and second adhesives. In some embodiments, step 108 includes pressing the first component and the second component together using a predetermined force/pressure, thickness of bonding layer (e.g., by deforming the adhesive to a desired thickness), hold time, or a combination thereof. As illustrated, components 151 and 152 may be brought into proximity such that they form an interface in which adhesives 161 and 162 are arranged.

Step 110 includes applying a first curing schedule, corresponding to the faster-curing adhesive of steps 104 and 106. The first curing schedule may include a time duration, a temperature, a pressure (e.g., a contact pressure), an irradiation (e.g., UV irradiation provided by a suitable UV source), an ambient humidity condition, any other suitable condition for curing, or any combination thereof. For example, the first curing schedule may include a predetermined temperature threshold and a predetermined time duration. In an illustrative example, steps 108 and 110 may be performed concurrently, wherein the first and second components are positioned and held together while the first curing schedule is performed. The first curing schedule is relatively fast as compared to the second curing schedule of step 112. The first curing schedule allows the first and second components to be bonded in seconds or minutes to allow handling and manipulation of the bonded assembly without having to wait for a full cure of the slower-curing adhesive. As illustrated, first adhesive 161 cures first, as indicated by the solid black fill in FIG. 1.

Step 112 includes applying a second curing schedule, corresponding to the slower-curing or later-curing adhesive of steps 104 and 106. The second curing schedule may include a time duration, a temperature, a pressure (e.g., a contact pressure), an irradiation (e.g., UV irradiation provided by a suitable UV source), any other suitable condition for curing, or any combination thereof. For example, the second curing schedule may include a predetermined temperature threshold and a predetermined time duration. The second curing schedule allows the first and second components to be bonded strongly for operation, and may occur over a longer time scale than the first curing schedule of step 110. Because the first curing schedule allows the bonded assembly to be manipulated, subsequent manufacturing processes can be applied to the assembly. As illustrated, second adhesive 162 cures second, as indicated by the solid black fill in FIG. 1.

In an illustrative example, referencing FIG. 1, the first adhesive may include a UV-cure adhesive, and the second adhesive may include a two-part epoxy adhesive. While the second adhesive is stronger than the UV-cure adhesive, the second adhesive may take longer to cure. After positioning components 151 and 152, the assembly is irradiated with UV light to set the first adhesive, thus providing structural support to the assembly while the second adhesive cures. Accordingly, component 151, component 152, or both may include holes, slots, opening, any other suitable features, or any combination thereof to allow curing. For example, either or both of components 151 or 152 may include holes or be made of material having sufficient transmittance to allow UV irradiation to reach adhesive 161.

Figure 2:
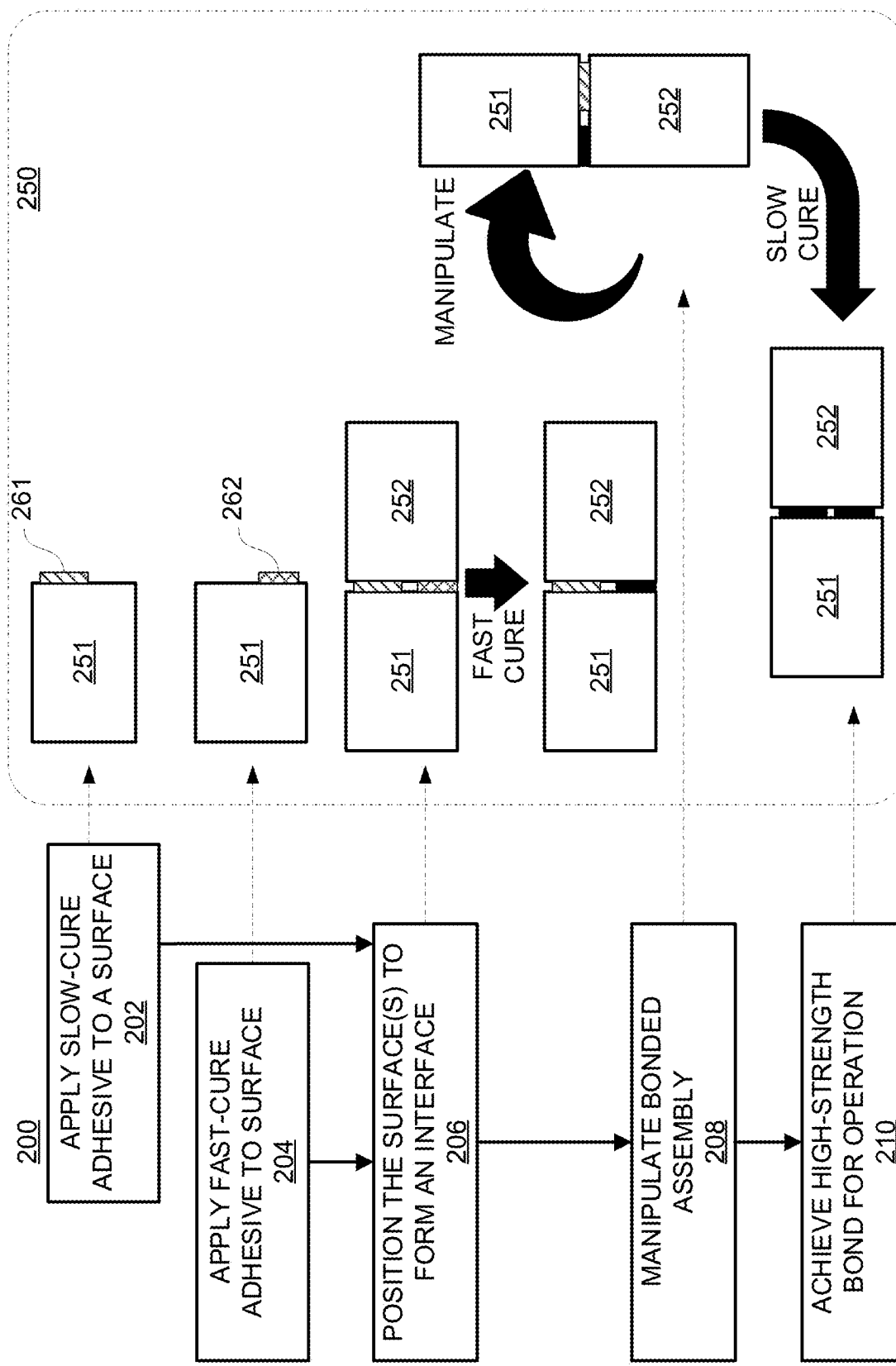
FIG. 2 shows a flowchart of an illustrative process for applying fast-cure and slow-cure adhesives to allow manipulation of components of a battery module, in accordance with some embodiments of the present disclosure.

FIG. 2 shows a flowchart of illustrative process 200 for applying fast-cure and slow-cure adhesives to allow manipulation of components of a battery module, in accordance with some embodiments of the present disclosure. Panel 250 of FIG. 2 illustrates bonding of components 251 and 252 using process 200. In some embodiments, process 200 represents an illustrative example of process 100 of FIG. 1.

Step 202 includes applying a slow-cure adhesive to a surface. The surface may include a surface of a first component, a second component, another component, or a combination thereof. As illustrated in panel 250, slow-cure adhesive 261 is applied to a surface of component 251. Because slow-cure adhesive 261 cures slowly, component 251 can be positioned without the adhesive curing prior to interfacing with component 252. The slow-cure adhesive may include, for example, a two-part structural mix-cure acrylic adhesive that cures in the order of tens of minutes after mixing, a one-part or two-part epoxy adhesive that cures in the order of hours to days, any other suitable slow-cure adhesive, or any combination thereof.

Step 204 includes applying a fast-cure adhesive to a surface. The surface may include a surface of a first component, a second component, another component, or a combination thereof. As illustrated in panel 250, fast-cure adhesive 262 is applied to a surface of component 252. Because fast-cure adhesive 262 cures relatively quickly, components 251 and 252 are then positioned at step 206 in an intended assembled configuration. In some embodiments, the slow-cure adhesive of step 202 is applied over a first portion of an interface between the first and second components, and the fast-cure adhesive is applied over a second portion of the interface. For example, the slow-cure and fast-cure adhesives may each be applied as beads following a suitable path. The paths or coverage of the slow-cure and fast-cure adhesives need not cross or otherwise be coincident (e.g., the first and second portions may be separate and non-overlapping). The fast-cure adhesive may include, for example, UV-cure adhesives, cyanoacrylate adhesives, any other suitable adhesive that cures on the order of minutes or less, or any combination thereof. To illustrate, for example, adhesives of this type may be able to cure to 100% of their design strength within 2 minutes of marrying components 251 to 252 from exposure to either ambient humidity or ultraviolet radiation. In some embodiments, step 204 includes applying a curing schedule for the fast-cure adhesive. The curing schedule may include a period of time (e.g., waiting seconds or minutes for the moisture-cure adhesive to cure), applying a suitable irradiance (e.g., applying UV light to the fast-cure adhesive), exposing the adhesive to environmental conditions (e.g., ambient humidity, temperature), any other suitable process step, or any combination thereof.

In some embodiments, the fast-cure adhesive includes a UV-cure adhesive. For example, UV-cure adhesives may follow a radical-cure chemical polymerization that is initiated when a photo-initiator in the adhesive absorbs the UV light that is irradiated on the sample, thus generating the first radicals that propagate the full polymerization. To illustrate, the fast-cure adhesive may include acrylic.

In some embodiments, the fast-cure adhesive includes a moisture-cure adhesive. For example, moisture-cure adhesives (e.g., including "super glue") may polymerize when they are exposed to an acid. They may include a disbursed stabilizer while stored (e.g., on the shelf or in the bottle). When the adhesive is squeezed into a joint, the acid from water in the air (e.g., humidity) activates the stabilizer (e.g., resulting in curing). To illustrate, moisture-cure adhesives may include 2-ethyl-cyanoacrylate. In some embodiments, moisture-cure adhesives may include disbursed rubber improve toughness.

Step 206 includes positioning surfaces to form an interface of a bonded assembly. In some embodiments, step 206 includes arranging the first and second components in a desired configuration such that when the first and second adhesives cure, a desired assembly results. In some embodiments, step 206 includes positioning a first component and a second component. For example, in some embodiments, the first component, second component, or both includes one or more locating features to allow more precise positioning during curing of the first and second adhesives. In some embodiments, step 206 includes pressing two or more components together using a predetermined force/pressure, thickness of bonding layer (e.g., by deforming the adhesive to a desired thickness), hold time, or a combination thereof. As illustrated, components 251 and 252 may be brought into proximity such that they form an interface in which slow-cure adhesive 261 and fast-cure adhesive 262 are arranged.

Step 208 includes manipulating the bonded assembly. Step 208 may include, for example, re-positioning the bonded assembly (e.g., translating, rotating, or a combination thereof), bonding further components to the bonded assembly, electrically coupling or more components of the bonded assembly (e.g., battery cells welded via links to one or more busbars), arranging one or more busbars against the bonded assembly, arranging one or more structural components against the bonded assembly, preparing one or more surfaces of the bonded assembly, any other suitable processing or manufacturing step, or any combination thereof. In some embodiments, step 208 includes applying a force or stress load that is less than that experienced, or expected to be experienced, by a finished assembly in operation (e.g., where the finished assembly includes the bonded assembly). As illustrated, fast-cure adhesive 262 cures first, as indicated by the solid black fill in FIG. 2 (e.g., after positioning at step 206 and before manipulation at step 208).

Step 210 includes achieving high-strength bond for operation. The high strength bond is provided by curing the slow-cure adhesive of step 202. In some embodiments, step 210 includes applying a curing schedule for the slow-cure adhesive. The curing schedule may include a period of time (e.g., waiting minutes or hours for the slow-cure adhesive to cure), applying a suitable environmental condition (e.g., temperature, humidity), any other suitable process step, or any combination thereof. Step 210 may occur before, during, or after manipulation of the bonded assembly at step 208. In some embodiments, step 210 may occur over a relatively long time scale (e.g., hours to days) to completely cure the slow-cure adhesive, over which time any suitable manipulation of the bonded assembly may occur. As illustrated, slow-cure adhesive 261 cures after fast-cure adhesive 262, as indicated by the solid black fill in FIG. 2 (e.g., after manipulation at step 208 and before operation).

In some embodiments, process 200 includes using both an instant-cure adhesive and a two-part high-strength adhesive (e.g., on the same joint) to achieve quick curing for workpiece manipulation and longer-term curing for a higher strength bond. In some embodiments, process 200 allows a decrease in manufacturing time for assembling battery modules, eliminates the need for buffering zones that allow curing of the high-strength adhesive (e.g., thus saving room on the manufacturing floor), eliminates the need for expensive and complex tooling to hold parts in place while the high-strength adhesive cures, or a combination thereof.

In an illustrative example, processes 100 and 200 may be applied to any high-strength joint that needs to be generated (e.g., in a battery system). In some embodiments, the joint may need to be tolerant of cyanoacrylate adhesive or a UV curing schedule, if used. In a further example, interfaces requiring uniform thermal management may require a thermal filler, and the fast-cure adhesive may be selected based on this criterion. In a further example, processes 100 and/or 200 may be applied to joints providing structural support between components in a battery module such as shear walls, busbars, current collector assembly, inverter, power electronics, any other suitable components, or any combination thereof.

Figure 3:
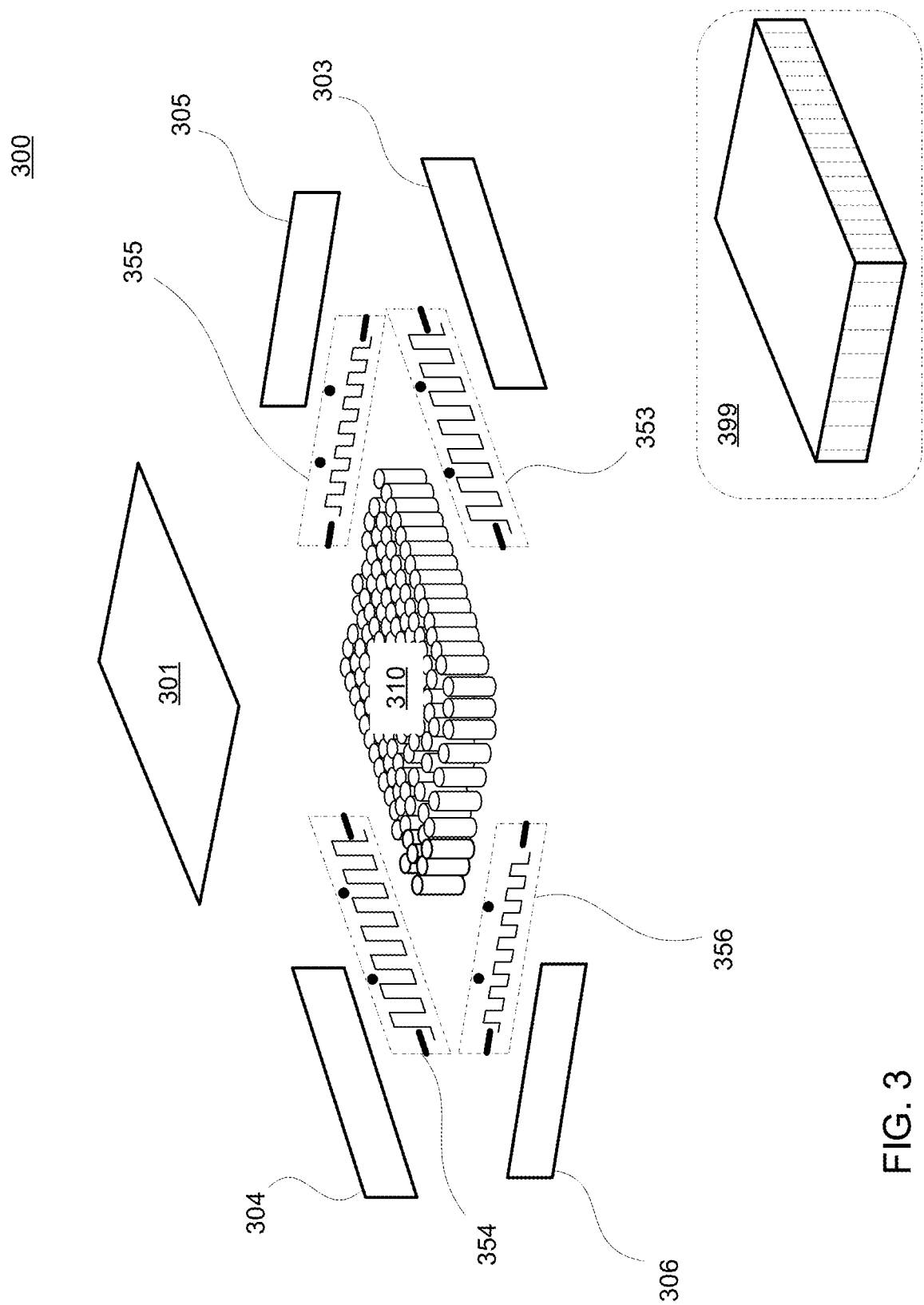
FIG. 3 shows an exploded perspective view, and an assembled perspective view, of an illustrative battery module assembled using adhesives, in accordance with some embodiments of the present disclosure.

FIG. 3 shows an exploded perspective view, and an assembled perspective view, of illustrative battery module 300 assembled using adhesives, in accordance with some embodiments of the present disclosure. Battery module 300 includes plurality of battery cells 310, layer 301, and side wall sections 303-306, affixed together using adhesives 353-356. As used herein, the term "side wall" refers to the collection of lateral surfaces arranged around a plurality of battery cells, and may include a single section or more than one section (e.g., a plurality of sections such as four sections, as illustrated), arranged adjacent to each other or with gaps in between one or more neighboring sections. To illustrate, side wall sections 303-306 may be joined as, or otherwise parts of, a single component (e.g., bent sheet metal), optionally with an open seam to allow ease of installation. As illustrated, adhesive 353 bonds side wall section 303 to a first side of plurality of battery cells 310; adhesive 354 bonds side wall section 304 to a second side of plurality of battery cells 310; adhesive 355 bonds side wall section 305 to a third side of plurality of battery cells 310; and adhesive 356 bonds side wall section 306 to a fourth side of plurality of battery cells 310. The sides of plurality of battery cells 310 include a collection of cylindrical interfaces to which side wall sections 303-306 may be bonded. For example, each of side wall sections 303-306 may contact only a portion of battery cells arranged on the respective side (e.g., an outermost portion). In a further example, side wall sections 303-306 may be flat, curved, segmented, compound-shaped, scalloped (e.g., to accommodate and more fully follow the curved battery cells), have any other suitable profile or shape, or any combination thereof.

In some embodiments, battery cells of plurality of battery cells 310 may be arranged in a close packing (e.g., hexagonal close packing having any suitable spacing), an array (e.g. a rectangular array), or any other suitable arrangement. In some embodiments, each battery cell of plurality of battery cells 310 may be pressed axially such that ends of the plurality of battery cells distal to layer 301 substantially lie in a plane parallel to layer 301 (e.g., thus laterally and axially aligned). Accordingly, layer 301 may be adhered to plurality of battery cells 310 by any suitable adhesive or combination thereof (e.g., a fast-cure and/or slow-cure adhesive). For example, layer 301 may adhered by an adhesive applied as a continuous layer, a layer having holes or openings, an arrangement of suitable drops or dollops that correspond with the arrangement of plurality of battery cells 310, a path that extends to interface with each battery cell of plurality of battery cells 310 (e.g., in a serpentine path), any other suitable application type, or any combination thereof.

Layer 301 may include one or more current collectors configured to be electrically coupled to plurality of battery cells 310 (or a subset thereof), a carrier configured to maintain a lateral arrangement of plurality of battery cells 310, or a combination thereof. For example, layer 301 may include a current collector assembly including a plurality of current collectors (e.g., which may include comb-like structures that spread over the battery cells in the plane of layer 301). Each current collector may be coupled to a subset of plurality of battery cells 310 to form electrical buses. The electrical coupling may be achieved by bonding, welding (e.g., ultrasonic welding, laser welding), pressing or spring force, or a combination thereof (e.g., which may occur during step 208 of process 200 of FIG. 2). To illustrate, layer 301 may include a carrier that is dielectric or otherwise non-conducting electronically, thus providing insulation between layer 301 and plurality of battery cells 310. Accordingly, a plurality of leads may be affixed to the current collector(s) of layer 301 and plurality of battery cells 310 to create electrically conductive paths among plurality of battery cells 310. The current collectors may electrically couple subsets of battery cells in parallel, with the subsets being electrically coupled in series.

In some embodiments, adhesives 353, 354, 355, and 356 include the same type or types of adhesive. In some embodiments, adhesives 353-356 each include the same one or more adhesives. For example, adhesives 353-356 may each include two adhesives to form a pattern (e.g., a fast-cure and a slow-cure adhesive). To illustrate, process 100 of FIG. 1, or process 200 of FIG. 2, may be applied to assemble battery module 300. In some embodiments, each of adhesives 353, 354, 355, and 356 may include a high-strength adhesive and an instant-cure adhesive, which is configured to cure faster than the high-strength adhesive.

In some embodiments, battery module 300 is adhered to a cooling pate, configured to transfer heat from plurality of battery cells 310. In some embodiments, plurality of battery cells 310 are adhered to side wall sections 303-306 of battery module 300 as well as to a carrier of layer 301 that maintains the positioning of the tops of plurality of battery cells 310. Battery module 300, during manufacturing, may undergo various manufacturing steps and may need to be manipulated during the manufacturing process. Accordingly, in order to decrease the amount of time needed before battery module 300 can be manipulated, a fast-cure adhesive (e.g., such as a UV cure adhesive or other suitable adhesive) is used to provide sufficient strength for battery module 300 to be manipulated before the high-strength adhesive sufficiently cures. As illustrated in FIG. 3, the fast-cure adhesive is applied at a first portion of each interface (e.g., at the corners of the battery module) as well as between layer 301 and plurality of battery cells 310. For example, the fast-cure portions of adhesives 353-356 may be cured in seconds using a UV light source and may provide sufficient strength for battery module 300 to undergo manipulation. Also as illustrated in FIG. 3, high-strength adhesive is applied to each of the battery cells interfacing to side wall sections 303-306 (e.g., in a continuous pattern as shown). For example, this ensures that each battery cell interfaces to high-strength adhesive for high strength bonds with side wall sections 303-306. As illustrated, fast-cure adhesive is shown by thicker lines or dots, and slow-cure adhesive (e.g., high-strength adhesive) is shown by thinner lines.

Figure 4:
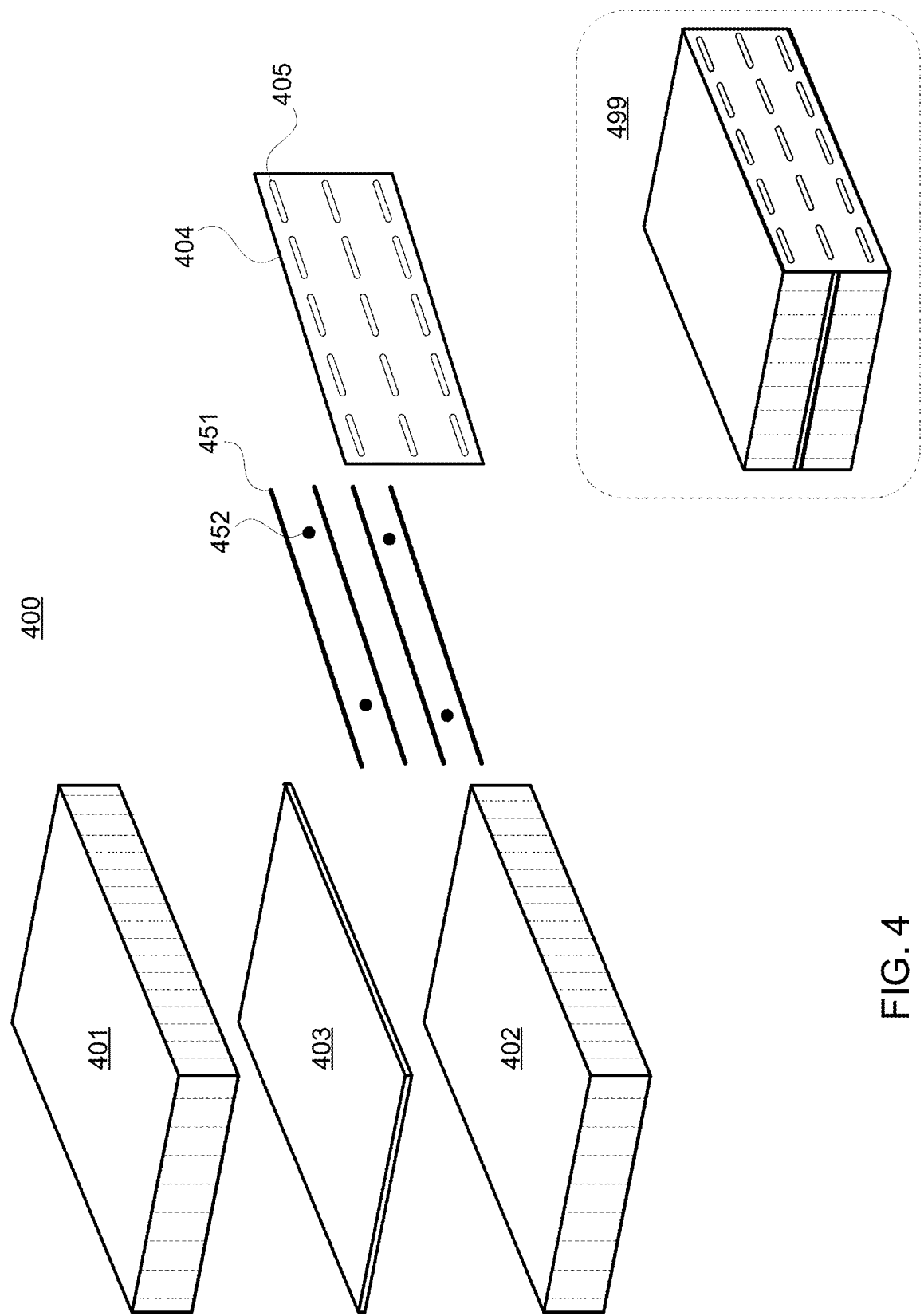
FIG. 4 shows an exploded perspective view, and an assembled perspective view, of an illustrative battery system assembled using adhesives, in accordance with some embodiments of the present disclosure.

FIG. 4 shows an exploded perspective view, and an assembled perspective view (e.g., in panel 499), of illustrative battery system 400 assembled using adhesives, in accordance with some embodiments of the present disclosure. Battery system 400, as illustrated, includes battery modules 401 and 402 (e.g., each of which may be similar to battery module 300 of FIG. 3), cooling plate 403, and mounting bracket 404, affixed together using adhesives 451 and 452. As illustrated, adhesive 451 (shown as lines) is a slow-cure adhesive bonding mounting bracket 404 to a first side of a subassembly including battery modules 401 and 402. Adhesive 452 (shown as dots) is a fast-cure adhesive bonding mounting bracket 404 to a first side of a subassembly including battery modules 401 and 402. A battery system such as battery system 400 may include one or more mounting brackets (e.g., mounting bracket 404) for providing structural support to the system. As illustrated, mounting bracket 404 includes through features 405 (e.g., slots as illustrated, but any suitable through feature(s) may be included), which may provide mechanical interlocking with battery modules 401 and 402, mechanical interlocking with cooling plate 403, optical access to fast cure adhesive 452 (e.g., to provide UV irradiation), or a combination thereof. Any suitable combination and pattern of adhesive 451 and adhesive 452 may be applied to the interface between mounting bracket 404 and the subassembly of battery modules 401 and 402, and cooling plate 403. As illustrated, dots of adhesive 452 are included to provide adhesion during manufacturing while beads of adhesive 451 cure.

Figure 5:
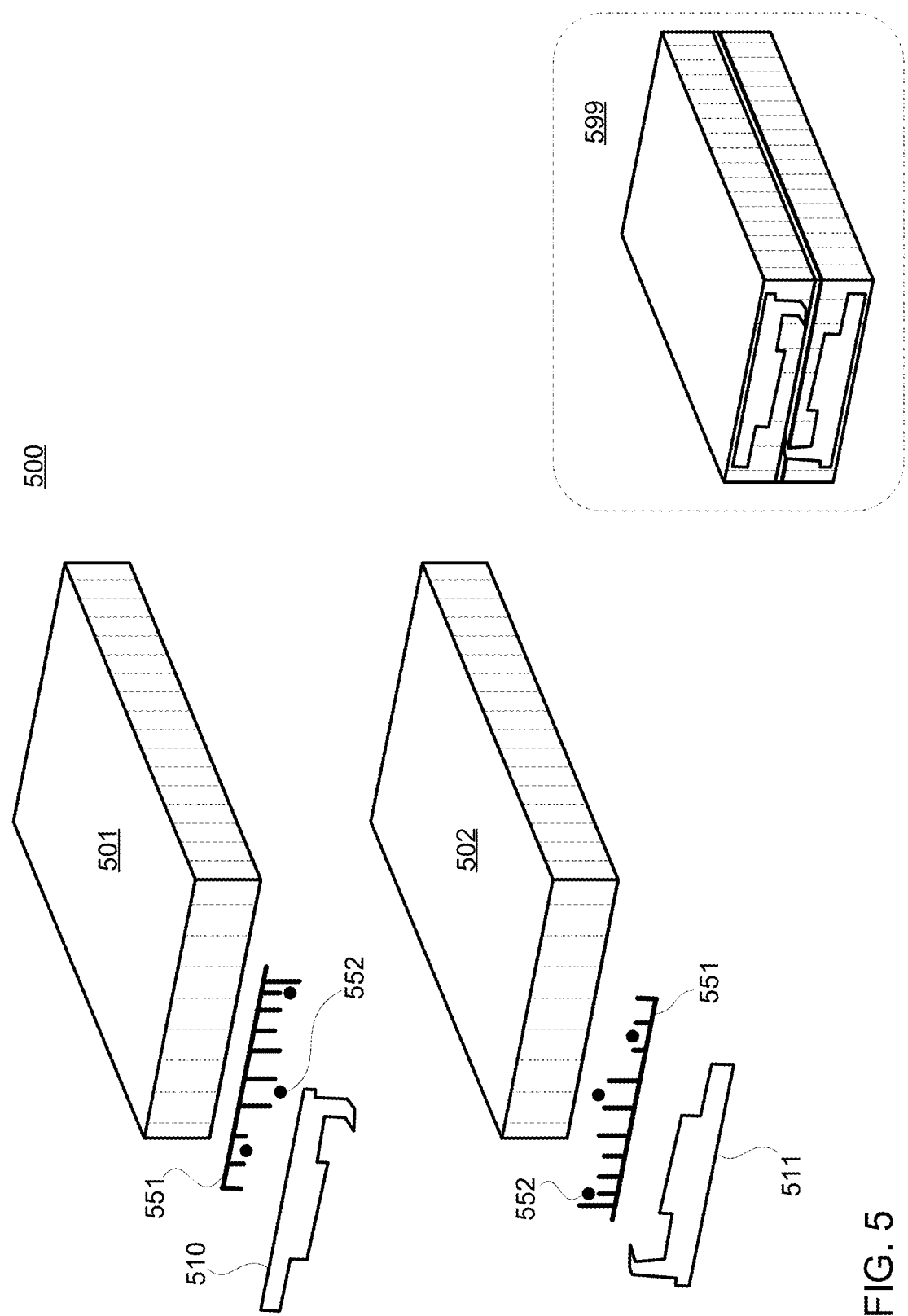
FIG. 5 shows an exploded perspective view, and an assembled perspective view, of an illustrative battery system having busbars assembled using adhesives, in accordance with some embodiments of the present disclosure.

FIG. 5 shows an exploded perspective view, and an assembled perspective view (e.g., in panel 599), of illustrative battery system 500 having busbars 510 and 511 assembled using adhesives 551 and 552, in accordance with some embodiments of the present disclosure. Battery system 500, as illustrated, includes battery modules 501 and 502 (e.g., each of which may be similar to battery module 300 of FIG. 3), and busbars 510 and 511, affixed together using adhesives 551 and 552. As illustrated, adhesive 551 (shown as lines) is a slow-cure adhesive bonding busbars 510 and 511 to respective battery modules 501 and 502. Adhesive 552 (shown as dots) is a fast-cure adhesive bonding busbars 510 and 511 to respective battery modules 501 and 502. A battery system such as battery system 500 may include one or more busbars (e.g., busbars 510 and 511), current collectors, control modules, power electronics, control circuitry, electrical components, or a combination thereof for managing operation of the system. Any suitable combination and pattern of adhesive 551 and adhesive 552 may be applied to the interface between electrical components (e.g., busbars 510 and 511) and the subassembly of battery modules 501 and 502. As illustrated, dots of adhesive 552 are included to provide adhesion during manufacturing while beads of adhesive 551 cure.

In an illustrative example, any of the assemblies of FIGS. 3-5 may be combined to form a battery system. For example, a battery system may include a plurality of battery cells, a carrier, current collectors, busbars, a cooling plate, one or more side wall sections, a mounting bracket, any other suitable components, or any combination thereof, assembled using a fast-cure adhesive and a slow-cure adhesive.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A method for making a battery system comprising:
   applying a first adhesive to a first surface, wherein the first adhesive comprises a first curing time;
   applying a second adhesive to a second surface, wherein the second adhesive comprises a second curing time less than the first curing time;
   positioning the first and the second surfaces to form an interface without the second adhesive overlapping the first adhesive at the interface; and
   curing the second adhesive based on the second curing time to allow a manufacturing process while the first adhesive cures.

2. The method of claim 1, wherein:
   the interface is between a plurality of battery cells and a sidewall;
   the first surface is at least one of a side of the plurality of battery cells or a side of the sidewall; and
   the second surface is at least one of a side of the plurality of battery cells or a side of the sidewall.

3. The method of claim 2, wherein the second adhesive is a UV-cure adhesive, wherein the sidewall comprises a transmittance sufficient to allow UV light to pass through to UV-cure the second adhesive during the curing.

4. The method of claim 1, wherein:
   the interface is between a plurality of battery cells and a carrier;
   the first surface is at least one of an end of the plurality of battery cells or a side of the carrier; and
   the second surface is at least one of an end of the plurality of battery cells or a side of the carrier.

5. The method of claim 1, wherein:
   the interface is between a busbar and a sidewall, wherein the busbar is configured to be electrically coupled to a plurality of battery cells, and wherein the sidewall is configured to provide structural support to the plurality of battery cells;
   the first surface is at least one of a surface of the busbar or a surface of the sidewall; and
   the second surface is at least one of a surface of the busbar or a surface of the sidewall.

6. The method of claim 1, wherein
   the interface is between a sidewall and a mounting bracket, wherein the sidewall is configured to provide structural support to a plurality of battery cells, and wherein the mounting bracket is configured to provide structural support to the plurality of battery cells and the sidewall;
   the first surface is at least one of a surface of the sidewall or a surface of the mounting bracket; and
   the second surface is at least one of a surface of the sidewall or a surface of the mounting bracket.

7. The method of claim 6, wherein the mounting bracket comprises one or more through features to allow the curing of the second adhesive.

8. The method of claim 1, wherein the manufacturing process comprises electrically coupling a plurality of battery cells to one or more busbars.

9. The method of claim 1, wherein the manufacturing process comprises mechanically coupling a plurality of battery cells to a cooling plate.

10. A method for making a battery system comprising:
    applying a first adhesive to a first portion of an interface between a plurality of battery cells and a sidewall, wherein the first adhesive comprises a first curing time;
    applying a second adhesive to a second portion of the interface between the plurality of battery cells and the sidewall, wherein the second adhesive comprises a second curing time less than the first curing time;
    positioning the sidewall adjacent to the plurality of battery cells without the second portion overlapping the first portion at the interface; and
    curing the second adhesive based on the second curing time to allow a manufacturing process while the first adhesive cures.

11. The method of claim 10, wherein the second adhesive comprises a UV-cure adhesive.

12. The method of claim 10, wherein the second adhesive comprises a moisture-cure adhesive.

13. The method of claim 10, wherein the first adhesive comprises an epoxy adhesive.

* * * * *